United States Patent
Yim (10) Patent No.: US 8,446,488 B2
(45) Date of Patent: May 21, 2013

(54) METHOD AND SYSTEM FOR FOCAL LENGTH-SPECIFIC COLOR ENHANCEMENT

(75) Inventor: Hyun-ock Yim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 495 days.

(21) Appl. No.: 12/720,799

(22) Filed: Mar. 10, 2010

(65) Prior Publication Data

US 2010/0231747 A1 Sep. 16, 2010

(30) Foreign Application Priority Data

Mar. 11, 2009 (KR) .................. 10-2009-0020733

(51) Int. Cl.
*H04N 9/73* (2006.01)

(52) U.S. Cl.
USPC ........ 348/223.1; 348/587; 348/649; 348/703; 382/167

(58) Field of Classification Search
USPC ....................................... 348/223.1; 382/167
See application file for complete search history.

(56) References Cited

U.S. PATENT DOCUMENTS

| | | | |
|---|---|---|---|
| 7,184,079 B2* | 2/2007 | Hoshuyama | 348/223.1 |
| 2003/0001958 A1* | 1/2003 | Hoshuyama | 348/223.1 |
| 2006/0176379 A1* | 8/2006 | Hyodo | 348/223.1 |
| 2008/0106764 A1* | 5/2008 | Fujino | 358/2.1 |
| 2009/0237416 A1* | 9/2009 | Sasaki | 345/589 |
| 2009/0251561 A1* | 10/2009 | Kuang et al. | 348/223.1 |

* cited by examiner

*Primary Examiner* — Roberto Velez
*Assistant Examiner* — Cynthia Segura
(74) *Attorney, Agent, or Firm* — Drinker Biddle & Reath LLP (57) ABSTRACT

A method of controlling a digital photographing device, the method including analyzing the color distribution of an input image, determining an enhancement color from the input image according to a predetermined criterion based on the analyzed color distribution, and enhancing the enhancement color in the input image. The predetermined criterion may be that a color distributed at a ratio higher than a predetermined ratio is determined as the enhancement color. The predetermined enhancement color may further depend on the focal length of the image.

18 Claims, 10 Drawing Sheets

| LENGTH INFORMATION | FIRST COLOR DOMAIN | SECOND COLOR DOMAIN | THIRD COLOR DOMAIN | FOURTH COLOR DOMAIN | FIFTH COLOR DOMAIN |
|---|---|---|---|---|---|
| 5.00cm~8.00cm | x 1.00 | x 1.03 | x 1.30 | x 1.23 | x 1.15 |
| 8.00cm~12.00cm | x 1.02 | x 1.10 | x 1.27 | x 1.17 | x 1.08 |
| ⋮ | | | | | |
| 27.00cm~30.00cm | x 1.30 | x 1.23 | x 1.10 | x 1.07 | x 1.03 |

METHOD AND SYSTEM FOR FOCAL LENGTH-SPECIFIC COLOR ENHANCEMENT

CROSS-REFERENCE TO RELATED PATENT APPLICATION

This application claims the benefit of Korean Patent Application No. 10-2009-0020733, filed on Mar. 11, 2009, in the Korean Intellectual Property Office, which is herein incorporated by reference in its entirety.

BACKGROUND OF THE INVENTION

1. Field of the Invention

The invention relates to a digital photographing device having a color enhancement function, a method of controlling such a digital photographing device, and a computer-readable storage medium having recorded thereon a computer program for executing the method of controlling the digital photographing device.

2. Description of the Related Art

A digital photographing device generates an image file from a signal, generated by light incident on an image sensor, through various processing steps, such as analog-to-digital conversion, color coordinate conversion, etc. The image sensor generates an electric signal according to the intensity of incident light, can be implemented with an image sensor such as a complementary metal-oxide semiconductor (CMOS) image sensor, a charge-coupled device (CCD) image sensor, or so forth, and can generate red/green/blue (RGB) data. The electric signal generated by the image sensor is converted into a digital signal through an analog-to-digital converter. The RGB data, which has been converted into the digital signal, is converted into YCbCr data, and then converted into a color space such as hue/saturation/value (HSV), hue/saturation/brightness (HSB), hue/lightness/saturation (HLS), or the like.

A digital photographing device may also perform post-correcting of a captured image. Post-correcting allows a user to correct the captured image as desired by the user by adjusting the brightness and sharpness of the captured image. For example, the user may enhance an edge of the captured image by increasing the brightness or sharpness of the captured image.

SUMMARY OF THE INVENTION

An embodiment of the invention analyzes a color distribution of a captured image and performs color enhancement automatically.

An embodiment of the invention also performs color enhancement, taking account of recognition degrees of respective colors according to focal lengths, by performing color enhancement differently according to the focal lengths. According to an aspect of the invention, there is provided a method of controlling a digital photographing device. The method includes (a) analyzing a color distribution of an input image, (b) determining an enhancement color from the input image according to a predetermined criterion based on a result of the analyzing of the color distribution, and (c) enhancing the enhancement color in the input image. The predetermined criterion may be such that a color distributed at a ratio higher than a predetermined ratio is determined as the enhancement color.

The method may further include (d) determining which one of a plurality of predetermined color domains a color of each pixel of the input image corresponds to, wherein the color domains are sections predetermined in a color space, and wherein (a) includes analyzing a color distribution based on the plurality of color domains, and (b) includes determining a color domain distributed at a ratio higher than a predetermined reference ratio as the enhancement color.

The method may further include (e) searching for a predetermined first color enhancement factor based on length information indicating a length to a subject, wherein the first color enhancement factor is a set of weights for the respective color domains for color enhancement, and is defined according to the length information and (f) generating a second color enhancement factor in which a weight for the enhancement color is increased from the first color enhancement factor, wherein (c) comprises enhancing the enhancement color by applying the second color enhancement factor to the input image. The method may further include (g) determining whether the length information falls within a predetermined enhancement length range, wherein (a) through (g) are performed if the length information falls within the predetermined enhancement length range.

The plurality of color domains may be defined according to hue in a color space.

Step (c) may include increasing saturation values of pixels of the input image, which have a color corresponding to the enhancement color, and step (a) may include analyzing the color distribution by applying weights according to saturation values of respective pixels of the input image.

According to another embodiment of the invention, there is provided a digital photographing device including a color distribution analyzing unit analyzing a color distribution of an input image, an enhancement color determining unit determining an enhancement color from the input image according to a predetermined criterion based on a result of the analyzing of the color distribution, and a color enhancing unit enhancing the enhancement color in the input image.

The digital photographing device may further include a color domain determining unit determining which one of a plurality of predetermined color domains a color of each pixel of the input image corresponds to, wherein the color domains are sections predetermined in a color space, and wherein the color distribution analyzing unit analyzes a color distribution based on the plurality of color domains, and the enhancement color determining unit determines a color domain distributed at a ratio higher than a predetermined reference ratio as the enhancement color.

The digital photographing device may further include a first color enhancement factor storing unit storing a first color enhancement factor which is a set of weights for the respective color domains for color enhancement and is defined according to length information indicating a length to a subject, and a second color enhancement factor generating unit searching for the first color enhancement factor based on the length information and generating a second color enhancement factor in which a weight for the enhancement color is increased from the first color enhancement factor, wherein the color enhancement unit enhances the enhancement color by applying the second color enhancement factor to the input image.

According to another embodiment of the invention, there is provided a computer-readable storage medium having recorded thereon a computer program, wherein the computer program includes code portions programmed to execute (a) analyzing a color distribution of an input image, (b) determining an enhancement color from the input image according to a predetermined criterion based on a result of the analyzing of the color distribution, and (c) enhancing the enhancement color in the input image.

BRIEF DESCRIPTION OF THE DRAWINGS

Various embodiments of the invention will now be described in detail with reference to the attached drawings in which.

DETAILED DESCRIPTION OF THE INVENTION

Hereinafter, exemplary embodiments of the invention will be described with reference to the accompanying drawings. The following description and the accompanying drawings are provided to understand operations according to the invention, and parts that can be easily implemented by those of ordinary skill in the art may be omitted therefrom.

In addition, the specification and drawings are not intended to limit the invention, which is defined by the appended claims. Terms used herein should be interpreted as the meanings and concepts which coincide with the technical spirit of the invention and to explain the invention for one of skill in the art.

Hereinafter, the exemplary embodiments of the invention will be described with reference to the accompanying drawings.

Figure 1:
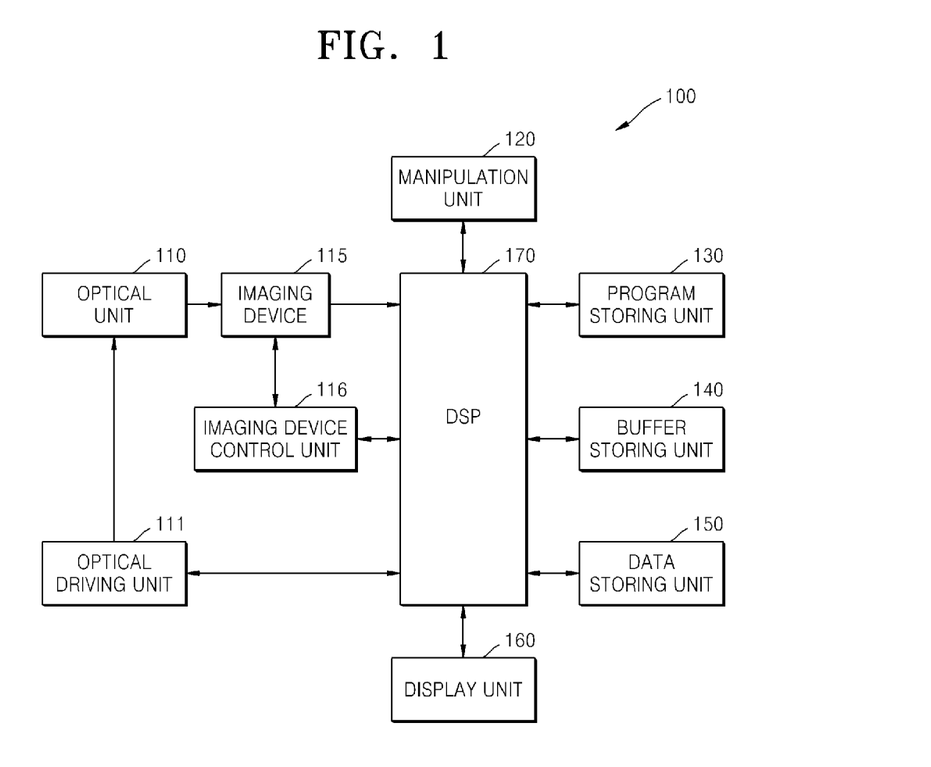
FIG. 1 is a block diagram showing a digital photographing device implementable as a digital photographing device, according to an embodiment of the invention.

FIG. 1 is a block diagram showing a digital photographing device 100 implementable as a digital photographing device, a method of controlling the digital photographing device, and a computer-readable storage medium, according to an embodiment of the invention.

The digital photographing device 100 according to the current embodiment may include an optical unit 110, an optical driving unit 111, an imaging device 115, an imaging device control unit 116, a manipulation unit 120, a program storing unit 130, a buffer storing unit 140, a data storing unit 150, a display unit 160, and a digital signal processor (DSP) 170.

The optical unit 110 provides an optical signal input from a subject to the imaging device 115. The optical unit 110 may include at least one lens such as a zoom lens for reducing or increasing the angle of view according to a focal length and a focus lens for adjusting the focus of a subject. The optical unit 110 may further include an iris for controlling light intensity.

The optical driving unit 111 controls the position of a lens and opening/closing of the iris. Focus may be adjusted by moving the position of a lens. Light intensity may be controlled by opening/closing of the iris. According to a control signal, which is automatically generated by an image signal input in real time or manually input by the user's manipulation, the optical driving unit 111 controls the optical unit 110.

An optical signal passing through the optical unit 110 forms an image of the subject on a light-receiving surface of the imaging device 115. The imaging device 115 may be a charge-coupled device (CCD) or a complementary metal-oxide semiconductor (CMOS) image sensor (CIS) which converts an optical signal into an electric signal. The sensitivity of the imaging device 115 may be controlled by the imaging device control unit 116. The imaging device control unit 116 may control the imaging device 115 according to a control signal, which is automatically generated by an image signal input in real time or manually input by the user's manipulation.

Through the manipulation unit 120, a control signal can be externally input, for example, from a user. The manipulation unit 120 includes a shutter-release button for inputting a shutter-release signal which exposes the imaging device 115 to light for a predetermined time interval to photograph a subject, a power button used to supply power, a wide-angle zoom button and a telephoto zoom button for increasing or reducing the angle of view, respectively, and other function buttons for mode selection from a text input mode, a photographing mode, a play mode, and the like, a white balance setting function, an exposure setting function, and so forth. The manipulation unit 120 may be implemented with, without being limited to, various buttons as described above, but may also be implemented in any form of user input, such as a keyboard, a touch pad, a touch screen, a remote control, or the like.

The digital photographing device 100 includes the program storing unit 130 for storing programs of an operating system and an application system of the digital photographing device 100, the buffer storing unit 140 for temporarily storing data required during an operation or storing result data, and the data storing unit 150 for storing data required for programs, such as an image file corresponding to an image signal.

The digital photographing device 100 also includes the display unit 160 for displaying an operational state of the digital photographing device 100 or image information obtained by the digital photographing device 100. The display unit 160 may provide visual information and/or audible information to a user. To provide visual information, the display unit 160 may include, for example, a liquid crystal display (LCD), an organic light emitting diode (OLED), an electrophoresis display (EPD), or other display.

The digital photographing device 100 includes the DSP 170 for processing an input image signal and controlling components of the digital photographing device 100 according to the input image signal or an externally input signal.

Conventional digital photographing devices do not have a function for automatically controlling color. However, in some conventional digital photographing devices, a user may control the saturation of an image by manually manipulating the conventional digital photographing devices.

According to an embodiment of the invention, the color distribution of a captured image is analyzed to determine a color to be enhanced, and the determined color is enhanced automatically.

Figure 2:
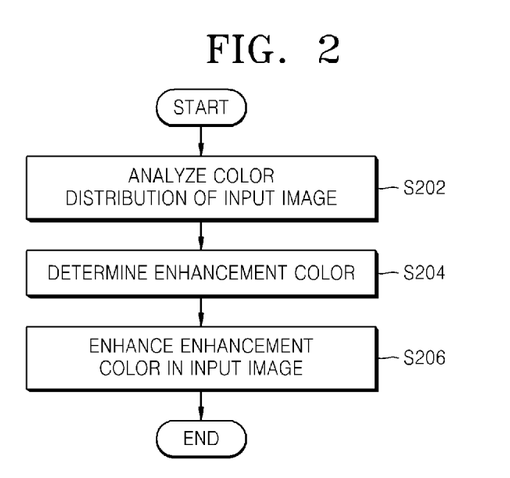
FIG. 2 is a flowchart illustrating a method of controlling a digital photographing device, according to an embodiment of the invention.

FIG. 2 is a flowchart illustrating a method of controlling a digital photographing device, according to an embodiment of the invention.

According to the method, a color to be enhanced (or an enhancement color) is determined by analyzing the color distribution of an input image and then color enhancement is performed automatically.

In step S202, the color distribution of an input image is analyzed. The color distribution analysis may be automatically performed upon input of the image if the digital photographing device is set to a separate automatic color enhancement mode. Alternatively, the color distribution analysis may be performed at a user's request for automatic color enhancement, or may be automatically performed in response to the input of the image if predetermined conditions are satisfied.

In the color distribution analysis, distributions of respective colors of pixels of the input image are obtained. For example, in the method of controlling a digital photographing device, the number of pixels or distribution ratios may be obtained for respective colors defined in a color space.

In step S204, an enhancement color is determined according to a predetermined criterion based on a result of the color distribution analysis. The determined enhancement color may be one or more colors. The predetermined criterion may be such that a color proving to be distributed at a ratio higher than a predetermined reference ratio in the result of the color distribution analysis is determined as the enhancement color. Alternatively, the predetermined criterion may be such that a color proving to be distributed at the highest ratio in the result of the color distribution analysis is determined as the enhancement color.

Once the enhancement color is determined, color enhancement is performed on pixels having the enhancement color in the input image, in step S206. The color enhancement may be performed by enhancing the saturation values of the pixels having the enhancement color. Also, the color enhancement may be performed by applying a gain only to the pixels having the enhancement color or applying different weights to respective color domains of the pixels having the enhancement color.

Figure 3:
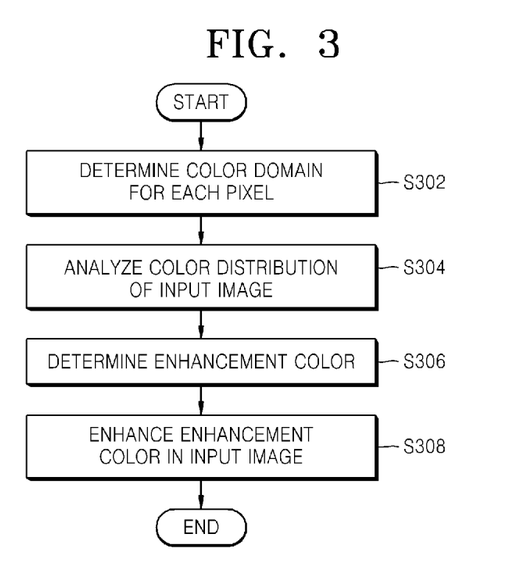
FIG. 3 is a flowchart illustrating a method of controlling a digital photographing device, according to another embodiment of the invention.

FIG. 3 is a flowchart illustrating a method of controlling a digital photographing device, according to another embodiment of the invention.

According to the method, color domains are determined in advance and color distribution analysis and color enhancement are performed based on the respective color domains. The color domains mean sections predetermined in a color space.

In step S302, it is determined which one of the predetermined color domains each pixel corresponds to. The color domains may be defined according to hue components in the color space as shown in FIG. 4.

Figure 4:
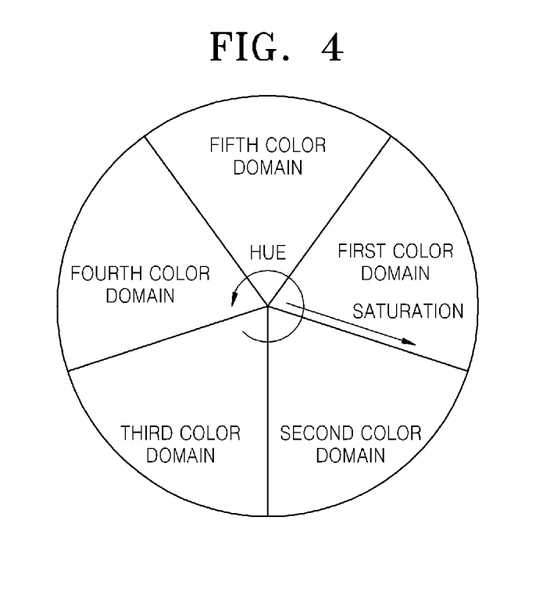
FIG. 4 shows a plurality of exemplary color domains defined according to hue components.

FIG. 4 shows a plurality of exemplary color domains defined according to hue components.

Referring to FIG. 4, first through fifth color domains are defined according to hue components. In the method of controlling a digital photographing device according to another embodiment of the invention, it can be determined according to a hue component of each pixel which one of the first through fifth color domains the pixel corresponds to.

The color space may be any color space which can define a color of each pixel of the input image. For example, a hue/saturation/value (HSV) or hue/lightness/saturation (HLS) color space defined according to hue, saturation, and brightness may be used for embodying the invention.

Once a color domain is determined for each pixel, a color distribution of the input image is analyzed with respect to the plurality of predefined color domains, in step S304.

Figure 5:
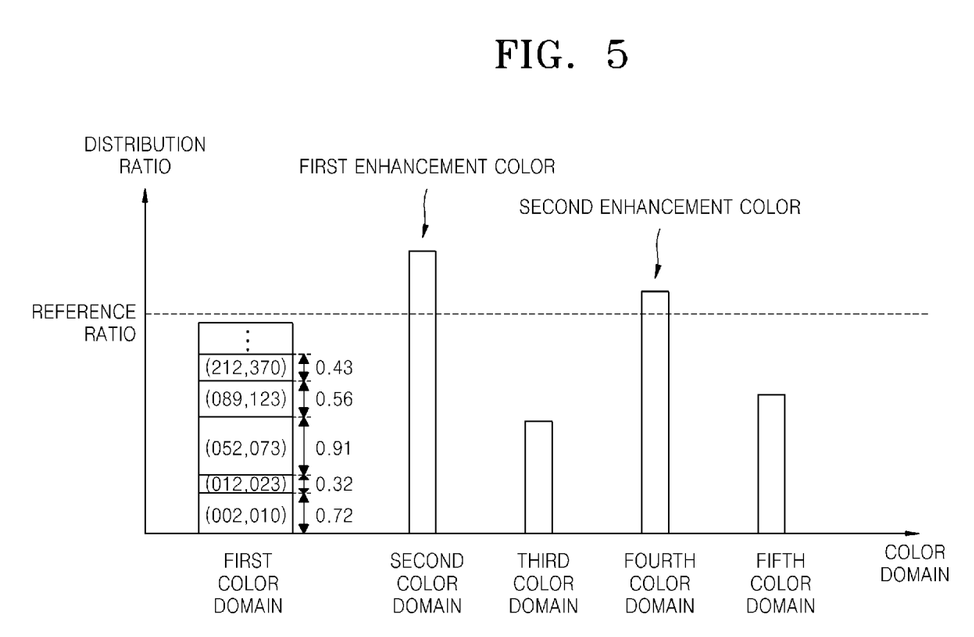
FIG. 5 is an exemplary graph showing a result of color distribution analysis according to another embodiment of the invention.

FIG. 5 is an exemplary graph showing a result of color distribution analysis according to another embodiment of the invention. As shown in FIG. 5, a distribution ratio for each color domain may be obtained. The distribution ratio indicates a ratio of the number of pixels having a color corresponding to each color domain with respect to the number of total pixels.

In the method according to another embodiment of the invention, in the color distribution analysis, a contribution of a pixel having a high saturation value may be evaluated as high. For example, as shown in a distribution ratio of the first color domain in FIG. 5, the contributions of respective pixels are evaluated differently. It is assumed that the position of each pixel of the input image is expressed with (x, y) coordinates as shown in FIG. 5. If saturation values of pixels (002, 010), (012, 023), (052, 073), (089, 123), and (212, 370) having a color corresponding to the first color domain are 0.72, 0.32, 0.91, 0.56, and 0.43, respectively, the contributions of the pixels (002, 010), (012, 023), (052, 073), (089, 123), and (212, 370) in the color distribution analysis are calculated differently in proportion to the saturation values as shown in FIG. 5. By calculating the contributions of respective pixels differently according to the saturation values of the respective pixels in the color distribution analysis, it is possible to determine, as an enhancement color, a color domain having actually distributed therein many color components corresponding to the color domain, as well as determining the enhancement color based on a distribution ratio for each color domain considering the number of pixels.

Upon completion of the color distribution analysis on the color domains, the enhancement color is determined according to a predetermined criterion based on the result of the color distribution analysis, in step S306.

FIG. 5 shows an example where the predetermined criterion is that a color domain proving to be distributed at a ratio higher than a predetermined reference ratio is determined as an enhancement color. The predetermined reference ratio may be predetermined by a designer or a user. If the result of the color distribution analysis proves that the second color domain and the fourth color domain are distributed at ratios higher than the predetermined reference ratio, the second color domain and the fourth color domain are determined as enhancement colors. As shown in FIG. 5, there may be one or more enhancement colors. In a high-to-low order of distribution ratios, the color domains distributed at ratios higher than the predetermined reference ratio may be determined as a first enhancement color and a second enhancement color, respectively.

Upon completion of the enhancement color determination, color enhancement is performed on pixels of the input image, which have colors corresponding to the color domains determined as the enhancement colors, in step S308. For example, the saturation values of the pixels having the colors corresponding to the color domains determined as the enhancement colors may be increased.

Figure 6:
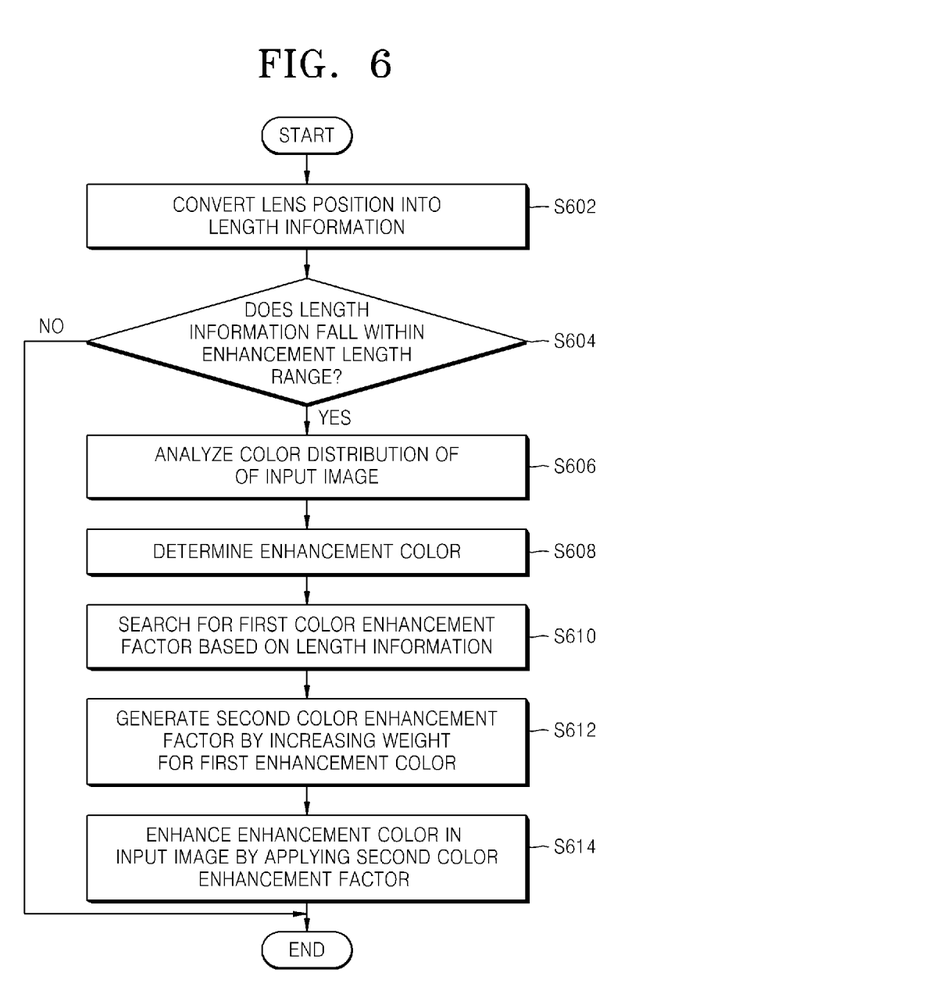
FIG. 6 is a flowchart illustrating a method of controlling a digital photographing device, according to still another embodiment of the invention.

FIG. 6 is a flowchart illustrating a method of controlling a digital photographing device, according to still another embodiment of the invention.

According to the method, different color enhancement factors are applied to color domains according to focal lengths. In addition, according to still another embodiment of the invention, color enhancement is performed only when a focal length falls within a predetermined enhancement length range.

In step S602, the lens position of the digital photographing device is converted into length information. For example, the length information may be obtained by using a focal length.

Once the length information is obtained, it is determined whether the length information falls within the predetermined enhancement length range, in step S604. The enhancement length range may define a length range in which color enhancement is required or the effect of color enhancement is high. For example, the enhancement length range may indicate a close-up photographing condition. Since a subject should be expressed vividly and clearly in close-up photographing, the color impression of close-up photographing is improved by color enhancement, thereby maximizing the effect of color enhancement.

If, in step 604, the length information does not fall within the enhancement length range, color enhancement is not performed in the method according to the current embodiment of the invention.

Otherwise, if the length information falls within the enhancement length range, a color distribution of the input image is analyzed in step S606 and an enhancement color is determined in step S608.

Once the enhancement color is determined, a first color enhancement factor is searched for based on the length information, in step S610. The first color enhancement factor is a set of weights for respective color domains for color enhancement, and is defined according to the length information.

Figure 7:
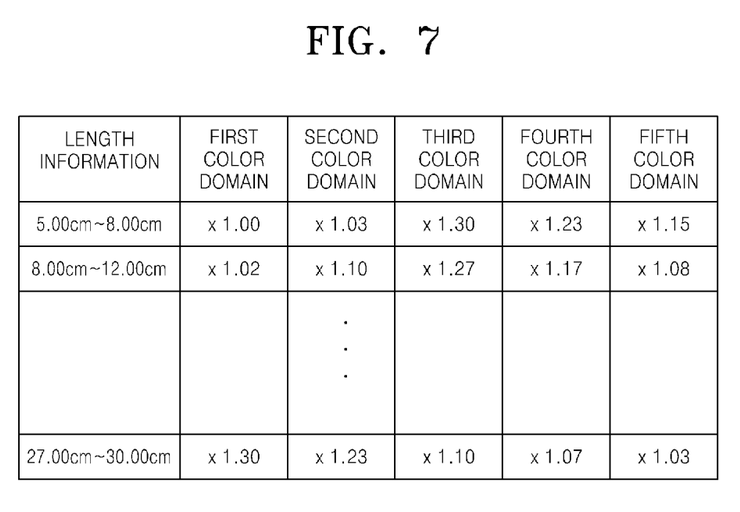
FIG. 7 shows exemplary first color enhancement factors defined according to focal lengths.

FIG. 7 shows exemplary first color enhancement factors defined according to focal lengths. As shown in FIG. 7, the first color enhancement factor may indicate a set of weights for respective color domains with respect to a plurality of predetermined length information ranges. Since a recognition degree of each color recognized by an imaging device varies with a length from the imaging device to a subject, a weight for each color domain changes with length information. Thus, by setting a weight for each color domain differently with respect to respective length information ranges as in the current embodiment of the invention, a change in a recognition degree of each color recognized by the imaging device according to a length can be compensated for, thus improving the color impression of a captured image.

Once the first color enhancement factor is found, a second color enhancement factor is generated by increasing weights for enhancement colors from the first color enhancement factor, in step S612.

Figure 8:
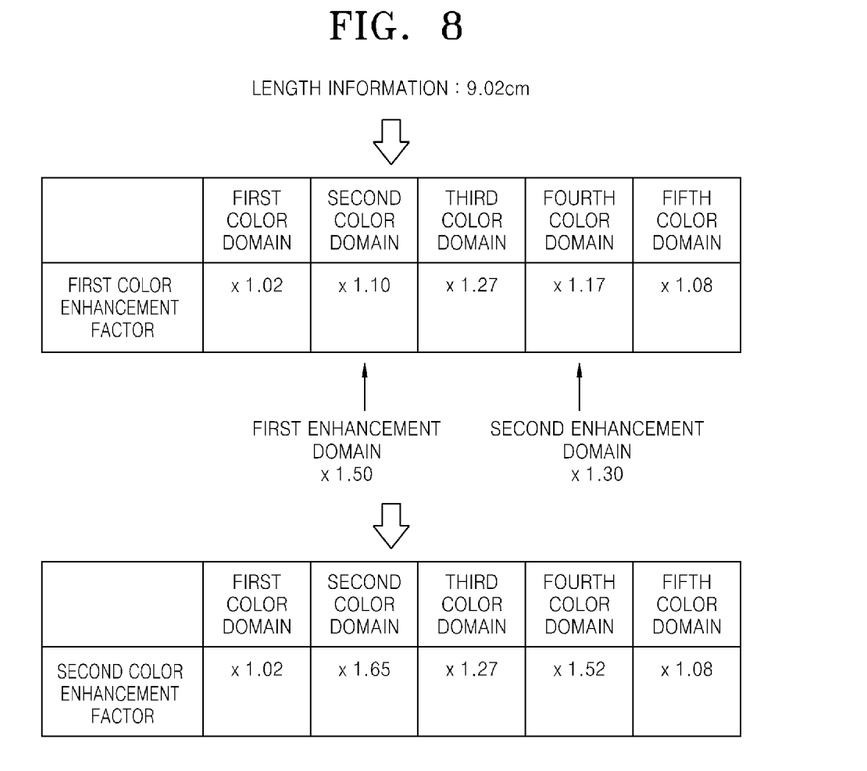
FIG. 8 shows an exemplary process of searching for a first color enhancement factor and generating a second color enhancement factor.

FIG. 8 shows an exemplary process of searching for the first color enhancement factor and generating the second color enhancement factor.

As shown in FIG. 8, if length information is 9.02 cm, a first color enhancement factor corresponding to the length information is searched for in the current embodiment of the invention. If enhancement colors are determined as shown in FIG. 5, weights for the second color domain and the fourth color domain are increased to generate the second color enhancement factor. At this time, weights for the first enhancement color and the second enhancement color having different distribution ratios may be increased at different ratios. For example, the weight for the first enhancement color having the highest distribution ratio is increased by 1.5 times and the second enhancement color having the second highest distribution ratio is increased by 1.3 times.

Once the second color enhancement factor is generated, the second color enhancement factor is applied to the input image to enhance the enhancement colors, in step S614. If the second color enhancement factor is generated as shown in FIG. 8, the saturation values of pixels corresponding to the first color domain are increased by 1.02 times and those corresponding to the second color domain are increased by 1.65 times. The saturation values of pixels corresponding to the third through fifth color domains are increased by weights in the second color enhancement factor corresponding to the respective color domains.

Figure 9:
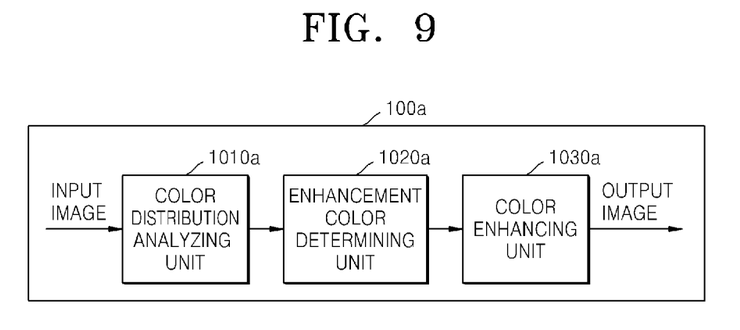
FIG. 9 is a block diagram of a digital photographing device according to an embodiment of the invention.

FIG. 9 is a block diagram of a digital photographing device 100a according to an embodiment of the invention. The digital photographing device 100a may include a color distribution analyzing unit 1010a, an enhancement color determining unit 1020a, and a color enhancing unit 1030a.

Upon input of an image, the color distribution analyzing unit 1010a analyzes a color distribution of the input image. The color distribution analyzing unit 1010a may perform color distribution analysis upon input of the image if a separate automatic color enhancement mode is set. Alternatively, the color distribution analyzing unit 1010a may perform color distribution analysis at a user's request for automatic color enhancement or in response to the input of the image if predetermined conditions are satisfied. The input image is provided from an image being input to an imaging device of the digital photographing device 100a.

Figure 10:
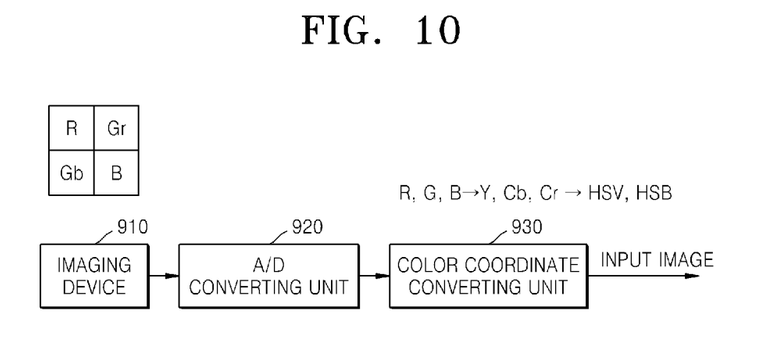
FIG. 10 shows an exemplary structure for generating an input image.

FIG. 10 shows an exemplary structure for generating an input image. The input image may be generated by a process in which an electric signal generated by an imaging device 910 of the digital photographing device 100a is converted by an analog-to-digital (A/D) converting unit 920 into a digital signal and then the digital signal is converted into predetermined color spaces by a color coordinate converting unit 930.

The imaging device 910 may be an image sensor composed of predetermined unit pixels, e.g., R, Gb, Gr, and B. Once an incident light is converted into an analog electric signal by the image sensor of the imaging device 910, the A/D converting unit 920 converts the analog electric signal generated by the imaging device 910 into a digital signal. The digital signal is converted into predetermined color spaces by the color coordinate converting unit 930. For example, the signal generated by the imaging device 910 may be converted into an RGB signal, converted into a Y/Cb/Cr signal, and then converted into a signal of a HSV coordinate system.

The input image may be a live-view image or a captured image.

However, the structure for generating the input image, which is shown in FIG. 10, is only an example, and the invention is not limited by such a scheme for generating the input image.

The enhancement color determining unit 1020a determines an enhancement color according to a predetermined criterion based on a result of the color distribution analysis performed by the color distribution analyzing unit 1010a. The enhancement color may be one or more colors. The predetermined criterion may be such that a color proving to be distributed at a ratio higher than a predetermined reference ratio in the result of the color distribution analysis is determined as the enhancement color. In another embodiment, the predetermined criterion may be such that a color proving to be distributed at the highest ratio in the result of the color distribution analysis is determined as the enhancement color.

Once the enhancement color is determined by the enhancement color determining unit 1020a, the color enhancing unit 1030a performs color enhancement on pixels having the enhancement color in the input image. The color enhancement may be performed by enhancing the saturation values of the pixels having the enhancement color. The color enhancement may be performed by applying a gain only to the pixels having the enhancement color or applying different weights to respective color domains of the pixels having the enhancement color.

Figure 11:
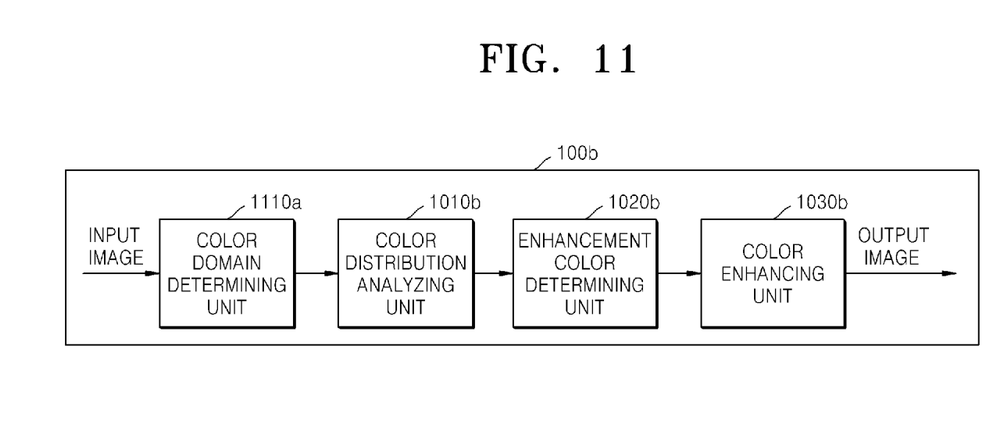
FIG. 11 is a block diagram of a digital photographing device according to another embodiment of the invention.

FIG. 11 is a block diagram of a digital photographing device 100b according to another embodiment of the invention. The digital photographing device 100b determines color domains in advance and performs color distribution analysis and color enhancement based on the respective color domains. The color domains mean sections predetermined in a color space. The digital photographing device 100b may include a color domain determining unit 1110a, a color distribution analyzing unit 1010b, an enhancement color determining unit 1020b, and a color enhancing unit 1030b.

Upon input of an image, the color domain determining unit 1110a determines which one of the plurality of predetermined color domains each pixel corresponds to. The color domains may be defined in advance according to hue components in the color space as shown in FIG. 4.

Once a color domain is determined for each pixel by the color domain determining unit 1110a, the color distribution analyzing unit 1010b analyzes a color distribution of the input image with respect to the predefined color domains. The color distribution analysis may be performed as shown in FIG. 5.

If the color distribution analyzing unit 1010b completes the color distribution analysis on the color domains, the enhancement color determining unit 1020b determines an enhancement color according to a predetermined criterion based on the result of the color distribution analysis. For example, a color domain distributed at a ratio higher than a predetermined reference ratio may be determined as the enhancement color.

If the enhancement color determining unit 1020b completes the enhancement color determination, the color enhancing unit 1030b performs color enhancement on pixels of the input image, which have a color corresponding to the color domain determined as the enhancement color. For example, the saturation values of the pixels having a color corresponding to the color domain determined as the enhancement color are increased.

Figure 12:
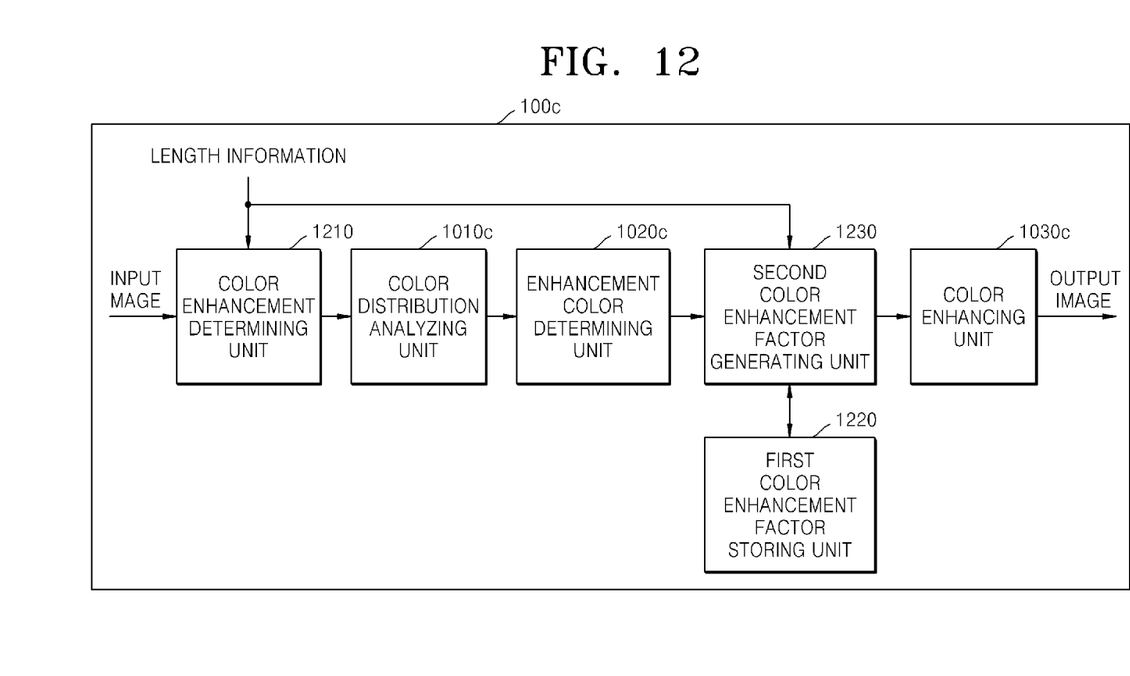
FIG. 12 is a block diagram of a digital photographing device according to still another embodiment of the invention.

FIG. 12 is a block diagram of a digital photographing device 100c according to still another embodiment of the invention.

The digital photographing device 100c applies different color enhancement factors to color domains according to focal lengths. In addition, according to the current embodiment of the invention, color enhancement is performed only when the focal length falls within a predetermined enhancement length range. The digital photographing device 100c may include a color enhancement determining unit 1210, a color distribution analyzing unit 1010c, an enhancement color determining unit 1020c, a first color enhancement factor storing unit 1220, a second color enhancement factor generating unit 1230, and a color enhancing unit 1030c.

The color enhancement determining unit 1210 determines whether the length information falls within the predetermined enhancement length range. To this end, the color enhancement determining unit 1210 may convert a position of a lens into length information. For example, the color enhancement determining unit 1210 may obtain the length information by using a focal length. The enhancement length range may define a length range in which color enhancement is required or the effect of color enhancement is high. For example, the enhancement length range may indicate a close-up photographing condition. Since a subject should be expressed vividly and clearly in close-up photographing, the color impression of close-up photographing is improved by color enhancement, thereby maximizing the effect of color enhancement.

The color distribution analyzing unit 1010c analyzes a color distribution of an input image only when the color enhancement determining unit 1210 determines that the length information falls within the enhancement length range.

The enhancement color determining unit 1020c determines an enhancement color based on a result of the color distribution analysis performed by the color distribution analyzing unit 1010c.

The first color enhancement factor storing unit 1220 stores first color enhancement factors defined according to lengths. The first color enhancement factor is a set of weights for respective color domains for color enhancement, and is defined according to the length information. For example, the first color enhancement factor storing unit 1220 stores the first color enhancement factors as shown in FIG. 7. The first color enhancement factor storing unit 1220 may be implemented with a non-volatile memory, for example, a flash memory, a hard disk drive, a read-only memory (ROM), a memory card, or the like.

Once the enhancement color is determined by the enhancement color determining unit 1020c, the second color enhancement factor generating unit 1230 searches for a first color enhancement factor in the first color enhancement factor storing unit 1220 and increases a weight for the enhancement color in the first color enhancement factor, thereby generating a second color enhancement factor. A process of generating the second color enhancement factor from the first color enhancement factor may be as shown in FIG. 8.

Upon generation of the second color enhancement factor, the color enhancing unit 1030c applies the second color enhancement factor to the input image, thereby enhancing the enhancement color. The color enhancing unit 1030c may enhance the color by multiplying a saturation value of each pixel of the input image by a weight corresponding to a color domain of the pixel with the second color enhancement factor.

The color distribution analyzing units 1010a, 1010b, and 1010c, the enhancement color determining units 1020a, 1020b, and 1020c, the color enhancing units 1030a, 1030b, and 1030c, the color domain determining unit 1110a, the color enhancement determining unit 1210, and the second color enhancement factor generating unit 1230 may be implemented with the program storing unit 130 for storing computer code programmed to execute functions of respective components and the DSP 170 for reading out and then executing the computer code corresponding to the respective components.

An embodiment of the invention can be implemented by storing computer-readable code in a computer-readable storage medium. The computer-readable storage medium includes any kind of storage medium having stored therein data that can be read by a computer system.

The computer-readable code is configured to perform operations for executing a method of controlling a digital photographing device according to an embodiment of the invention when being read out from the computer-readable storage medium and executed by the DSP 170. The computer-readable code may be implemented with various programming languages. Functional programs, code, and code segments for implementing the invention can be easily programmed by those of ordinary skill in the art.

Examples of the computer-readable storage medium include read-only memory (ROM), random-access memory (RAM), CD-ROMs, magnetic tapes, floppy disks, and optical data storage devices. The computer-readable storage medium can also be distributed over a network of coupled computer systems so that the computer-readable code is stored and executed in a decentralized fashion.

According to an embodiment of the invention, a digital photographing device analyzes the color distribution and determines a color to be enhanced for color enhancement automatically, without a need for a user to manually designate the color to be enhanced. In this way, user convenience can be improved.

Moreover, by determining the color to be enhanced through color distribution analysis, a color actually distributed at a high ratio is enhanced, thereby improving the effect of color enhancement.

Furthermore, by using different color enhancement factors according to focal lengths, a change in a recognition degree of each color according to a focal length can be compensated for, thus improving the color impression of a captured image. In particular, the invention may provide vivid and clear close-up photographing by allowing color impression adjustment to be automatically performed within a close-up length.

While the invention has been particularly shown and described with reference to exemplary embodiments thereof, it will be understood by those of ordinary skill in the art that various changes in form and details may be made therein without departing from the essential features of the invention. Accordingly, the exemplary embodiments should be considered in an illustrative sense not in a limiting sense. The scope of the invention is defined not by the detailed description but by the appended claims.

What is claimed is:

1. A method of controlling a digital photographing device, the method comprising the steps:
   (a) analyzing the color distribution of an input image by determining which one of a plurality of predetermined color domains a color of each pixel of the input image corresponds to, wherein the color domains are sections predetermined in a color space;
   (b) determining an enhancement color based on the analyzed color distribution such that a color domain distributed at a ratio higher than a predetermined ratio is determined as the enhancement color;
   (c) obtaining information relating the distance to a subject;
   (d) searching for a predetermined first color enhancement factor based on the information relating the distance to a subject, wherein the first color enhancement factor is a set of weights for the respective color domains for color enhancement, and is defined according to the distance information;
   (e) generating a second color enhancement factor in which a weight for the enhancement color is increased from the first color enhancement factor; and
   if) adjusting the input image using the second color enhancement factor.

2. The method of claim 1, further comprising step (g) determining whether the distance information falls within a predetermined enhancement distance range,
   wherein steps (a) through (g) are performed if the distance information falls within the predetermined enhancement distance range.

3. The method of claim 1, wherein the plurality of color domains are defined according to hue in a color space.

4. The method of claim 1, wherein step (f) comprises adjusting saturation values of pixels of the input image.

5. The method of claim 1, wherein step (a) comprises analyzing the color distribution by applying weights according to saturation values of respective pixels of the input image.

6. The method of claim 1, wherein the set of weights of the first color enhancement factor comprises at least two different weights defined according to distance information of at least two different distances to the subject.

7. A digital photographing device comprising:
   a color domain determining unit determining which one of a plurality of predetermined color domains a color of each pixel of the input image corresponds to, wherein the color domains are sections predetermined in a color space;
   a color distribution analyzing unit that analyzes the color distribution of an input image based on the plurality of color domains;
   an enhancement color determining unit that determines an enhancement color from the input image based on the analyzed color distribution such that a color domain distributed at a ratio higher than a predetermined ratio is determined as the enhancement color;
   a first color enhancement factor storing unit that stores a first color enhancement factor which is a set of weights for the respective color domains for color enhancement and is defined according to information relating to distance to a subject;
   a second color enhancement factor generating unit that searches for the first color enhancement factor based on the distance information and generating a second color enhancement factor in which a weight for the enhancement color is increased from the first color enhancement factor; and
   a color enhancing unit that adjusts the input image using the second color enhancement factor.

8. The digital photographing device of claim 7, further comprising a color enhancement determining unit determining whether the distance information falls within a predetermined enhancement distance range,
   wherein the color distribution analyzing unit analyzes the color distribution when the distance information falls within the predetermined enhancement distance range.

9. The digital photographing device of claim 7, wherein the plurality of color domains are defined according to hue in a color space.

10. The digital photographing device of claim 7, wherein the color enhancing unit increases saturation values of pixels of the input image, wherein the pixels have a color corresponding to the enhancement color.

11. The digital photographing device of claim 7, wherein the color distribution analyzing unit analyzes the color distribution by applying weights according to saturation values of respective pixels of the input image.

12. The digital photographing device of claim 7, wherein the set of weights of the first color enhancement factor comprises at least two different weights defined according to information relating to at least two different distances to the subject.

13. A non-transitory computer-readable storage medium having recorded thereon a computer program, wherein the computer program comprises code portions programmed to execute:
   (a) analyzing the color distribution of an input image by determining which one of a plurality of predetermined color domains a color of each pixel of the input image corresponds to, wherein the color domains are sections predetermined in a color space;

(b) determining an enhancement color based on the analyzed color distribution such that a color domain distributed at a ratio higher than a predetermined ratio is determined as the enhancement color;
(c) obtaining information relating the distance to a subject;
(d) searching for a predetermined first color enhancement factor based on the information relating the distance to a subject, wherein the first color enhancement factor is a set of weights for the respective color domains for color enhancement, and is defined according to the distance information;
(e) generating a second color enhancement factor in which a weight for the enhancement color is increased from the first color enhancement factor; and
(f) adjusting the input image using the second color enhancement factor.

14. The computer-readable storage medium of claim 13, wherein the computer program further comprises a code portion programmed to execute (g) determining whether the distance information falls within a predetermined enhancement distance range,
wherein the code portions programmed to execute (a) through (g) are programmed to execute (a) through (g) when the distance information falls within the predetermined enhancement distance range.

15. The computer-readable storage medium of claim 13, wherein the plurality of color domains are defined according to hue in a color space.

16. The computer-readable storage medium of claim 13, wherein the code portion programmed to execute (f) is programmed to execute increasing saturation values of pixels of the input image, wherein the pixels have a color corresponding to the enhancement color.

17. The computer-readable storage medium of claim 13, wherein the code portion programmed to execute (a) is programmed to execute analyzing the color distribution by applying weights according to saturation values of respective pixels of the input image.

18. The computer-readable storage medium of claim 13, wherein the set of weights of the first color enhancement factor comprises at least two different weights defined according to distance information of at least two different distances to the subject.

* * * * *

UNITED STATES PATENT AND TRADEMARK OFFICE
CERTIFICATE OF CORRECTION

| | | |
|---|---|---|
| PATENT NO. | : 8,446,488 B2 | |
| APPLICATION NO. | : 12/720799 | |
| DATED | : May 21, 2013 | |
| INVENTOR(S) | : Hyun-ock Yim | |

It is certified that error appears in the above-identified patent and that said Letters Patent is hereby corrected as shown below:

In the Claims:

In Claim 1, Column 11, line 56, replace "if) adjusting the input image…" with

-- f) adjusting the input image --

Signed and Sealed this
Twentieth Day of August, 2013

Teresa Stanek Rea
*Acting Director of the United States Patent and Trademark Office*